US007128261B1

(12) United States Patent
Henderson et al.

(10) Patent No.: US 7,128,261 B1
(45) Date of Patent: Oct. 31, 2006

(54) METHOD AND APPARATUS FOR GENERATING AND DISPENSING GIFT CARDS

(75) Inventors: James Henderson, Cedar Hill, TX (US); Russell P. Blink, Plano, TX (US); Kenneth J. Lovegreen, Lake Kiowa, TX (US)

(73) Assignee: Long Range Systems, Inc., Dallas, TX (US)

(*) Notice: Subject to any disclaimer, the term of this patent is extended or adjusted under 35 U.S.C. 154(b) by 222 days.

(21) Appl. No.: 10/961,461

(22) Filed: Oct. 8, 2004

(51) Int. Cl.
*G06K 15/00* (2006.01)

(52) U.S. Cl. ...................................................... 235/383

(58) Field of Classification Search ................ 235/383, 235/487, 492
See application file for complete search history.

(56) References Cited

U.S. PATENT DOCUMENTS 5,513,117 A * 4/1996 Small ......................... 700/233
5,652,421 A 7/1997 Veeneman et al.
6,655,580 B1 * 12/2003 Ergo et al. .................. 235/375
6,957,746 B1 * 10/2005 Martin et al. ............... 221/131
7,028,896 B1 * 4/2006 Goldstein et al. ........... 235/436
2004/0099730 A1 * 5/2004 Tuchler et al. .............. 235/380

OTHER PUBLICATIONS

"CD-200—Card Dispenser", Asahi Seiko USA, Inc. (www.asahiseikousa.com), 2001, pp. 1-2.
"Model CD-1000 Series—Card Dispensers", Asahi Seiko USA, Inc. (www.asahiseikousa.com), 2001, pp. 1-2.
"SCD-1000—IC Card Dispenser/Encoder Mechanism", Asahi Seiko USA, Inc. (www.asahiseikousa.com), 2001, pp. 1-2.
"CIM-400 Card Issuing Machine", Cardcom Technology, Inc. (www.cardcom.com), date unknown, 1 page.

* cited by examiner

*Primary Examiner*—Daniel Stcyr
(74) *Attorney, Agent, or Firm*—Steven W. Smith

(57) ABSTRACT

A method and apparatus for generating and dispensing gift cards for an associated merchant. A customer enters a value for the gift card through a customer input pad, and pays for the card by swiping a credit card through a credit card reader. After authorization is received, a card transporter pulls a serialized gift card from a card stock hopper. The card transporter then moves the card to a gift card inspector, which determines whether the serial number of the gift card can be properly read. If not, the bad card is deposited in a bad card bin. If the serial number can be properly read, the card transporter moves the card to a good card dispenser, which dispenses the gift card to the customer.

9 Claims, 8 Drawing Sheets

METHOD AND APPARATUS FOR GENERATING AND DISPENSING GIFT CARDS

TECHNICAL FIELD OF THE INVENTION

The present invention is related to financial transaction systems. More particularly, and not by way of limitation, the present invention is directed to a method and apparatus for generating and dispensing gift cards having a financial value for purchasing goods and/or services from an associated merchant.

BACKGROUND OF THE INVENTION

The issuance of gift certificates has long been a useful way for merchants to increase sales and for customers to provide gifts to other persons. The receiving persons can then redeem the certificates for desired goods and/or services at the merchants who issued the gift certificates. A drawback to this process has been the inconvenience of having to purchase the certificate at a point-of-sale (POS) terminal at the merchant's location. This process often involves waiting for a sales person to become available before the certificate can be purchased and recorded in the merchant's POS system.

U.S. Pat. No. 5,652,421 to Veeneman et al. discloses a method and apparatus for generating gift certificates, which provides a kiosk through which a customer may purchase a gift certificate with a credit card. The customer can choose a merchant and a gift certificate value, and the kiosk prints and dispenses the certificate, and notifies the merchant. However, Veeneman still has several shortcomings. First is the large size of the kiosk, which limits its mobility and the number of places where it can be installed. Second, merchants today desire to use plastic programmable gift cards, similar in appearance to credit cards, and Veeneman is only capable of printing paper certificates. Third, Veeneman does not perform any kind of inspection to validate whether the gift certificate printed correctly. Thus, problems may arise if the customer did not receive a properly printed certificate, but was charged for it anyway.

It would be advantageous to have a method and apparatus for generating and dispensing gift cards that overcomes the shortcomings of existing gift certificate systems. The present invention provides such a method and apparatus.

SUMMARY OF THE INVENTION

In one aspect, the present invention is directed to an apparatus for generating and dispensing at least one gift card having a financial value for purchasing goods and/or services from an associated merchant. The apparatus includes data input means for receiving from a customer, a value for the gift card; payment input means for receiving payment for the gift card from the customer; and inspecting means for determining whether a serial number of the gift card can be properly read. The apparatus also includes dispensing means for dispensing the gift card to the customer, if the inspecting means can properly read the serial number of the gift card; and disposing means for disposing of the gift card, if the inspecting means cannot properly read the serial number. The apparatus also includes interfacing means for sending the serial number and the value of the gift card to the associated merchant for recording. Upon determining that the serial number could not be properly read, the inspecting means inspects another gift card to determine whether the serial number can be properly read.

In another aspect, the present invention is directed to an apparatus for generating and dispensing at least one gift card having a financial value for purchasing goods and/or services from an associated merchant. The apparatus includes data input means for receiving from a customer, a customer identification and a value for the gift card; payment input means for receiving payment for the gift card from the customer; and programming means for programming the gift card with the customer identification and the value. The apparatus also includes dispensing means for dispensing the programmed gift card to the customer; and inspecting means for determining whether the gift card was properly programmed. Upon determining that the gift card was properly programmed, the inspecting means passes the gift card to the dispensing means for dispensing to the customer, and upon determining that the gift card was not properly programmed, the inspecting means captures the gift card and causes the programming means to program another card.

In another aspect, the present invention is directed to an apparatus for generating and dispensing at least one gift card having a financial value for purchasing goods and/or services from an associated merchant. The apparatus includes a customer input pad that receives from a customer, a value for the gift card; and a credit card reader that reads a customer's credit card and obtains authorization for the gift card purchase from an external credit card authorization service. A card stock hopper stores a plurality of gift cards, each of which is preprogrammed with a unique serial number. A gift card inspector determines whether the serial number of a gift card pulled from the card stock hopper can be properly read, and if not, disposes of the card in a bad card bin that receives and holds the inspected gift card. If the card inspector determines that the serial number of the gift card could be properly read, a good card dispenser dispenses the gift card to the customer. A card transporter removes a single card from the card stock hopper, moves the card to the gift card inspector, places the card in the bad card bin if the card inspector determines that the serial number of the gift card could not be properly read, and moves the card to the good card dispenser if the card inspector determines that the serial number of the gift card could be properly read.

In yet another aspect, the present invention is directed to a method of generating and dispensing at least one gift card having a financial value for purchasing goods and/or services from an associated merchant. The method includes the steps of receiving from a customer, a value for the gift card; receiving payment for the gift card from the customer; determining whether a first gift card that is preprogrammed with a serial number can be properly read; and dispensing the first gift card to the customer, upon determining that the serial number of the first gift card could be properly read. If the serial number of the first gift card could not be properly read, the first gift card is captured and held. The method also includes the steps of determining whether a serial number of a second gift card can be properly read, if the first gift card is captured and held; and sending the serial number and the value of the dispensed gift card to the associated merchant for recording.

In still yet another aspect, the present invention is directed to a method of generating and dispensing at least one gift card having a financial value for purchasing goods and/or services from an associated merchant. The method includes the steps of receiving from a customer, a customer identification and a value for the gift card; receiving payment for the gift card from the customer; and programming a first gift card with the customer identification and the value. The method also includes determining whether the first gift card was properly programmed; capturing and holding the first gift card, upon determining that the first gift card was not properly programmed; and dispensing the first gift card to the customer, upon determining that the first gift card was properly programmed.

DETAILED DESCRIPTION OF EMBODIMENTS

Figure 1:
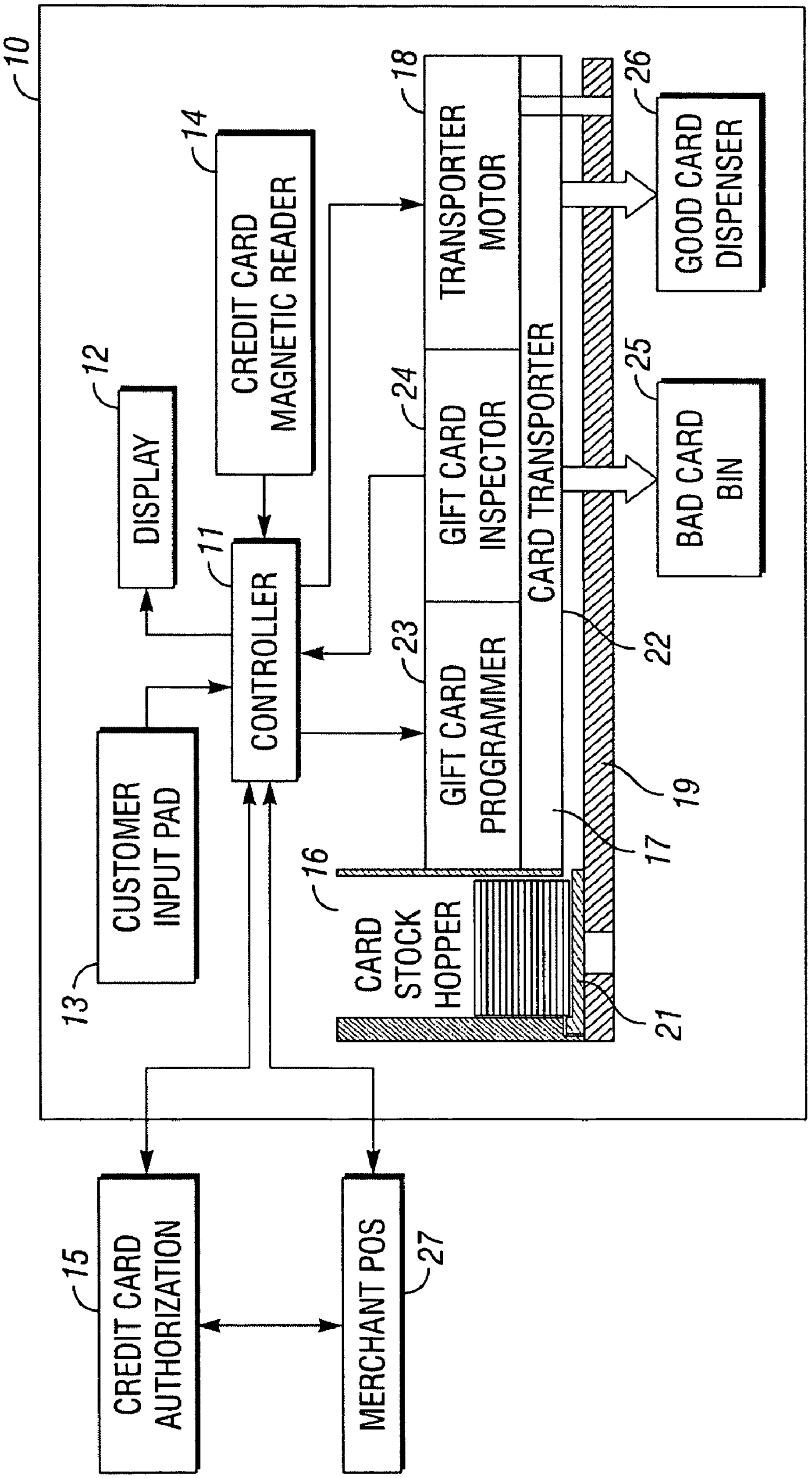
FIG. 1 is a simplified functional block diagram of an exemplary embodiment of the gift card dispenser of the present invention.

FIG. 1 is a simplified functional block diagram of the preferred embodiment of the gift card dispenser 10 for generating and dispensing gift cards for an associated merchant. A controller 11, such as a microcontroller or microprocessor, controls the gift card dispenser. In operation, a customer receives information from the controller on a display 12, and inputs information, such as the desired amount of the gift card, on a customer input pad 13. When prompted by the controller, the customer makes payment for the card through, for example, a credit card magnetic reader 14. The controller obtains authorization for the purchase from a remote credit card authorization service 15.

A card stock hopper 16 stores gift cards, which may be unprogrammed cards, cards preprogrammed with an identifier such as a serial number, or smart cards. Unprogrammed cards may be programmed in any suitable manner, such as magnetically, electrically, optically, or mechanically. In a first embodiment, the gift card includes a magnetic strip for programming unprogrammed cards. Upon command of the controller, a card transporter 17 pulls a card from the card stock hopper. The card transporter includes a transporter motor 18 and a threaded shaft 19, which causes a card slide 21 (see FIG. 5) to pull a single card from the hopper and move it along a track 22. In one embodiment, the transporter first moves the card past a gift card programmer 23, which programs the card with a gift amount and/or a customer identification. The customer identification may be obtained by the credit card reader 14, when the customer's credit card is read, or the customer may enter the identification using the customer input pad 13. The card transporter then moves the card past a gift card inspector 24, which ensures that the card has been properly programmed. If the card inspector determines that the card was not properly programmed, the inspector notifies the controller 11, which causes the card transporter to drop the bad card into a bad card bin 25. If the card inspector determines that the card was properly programmed, the transporter continues to move the good card to the end of the track where the card falls into a good card dispenser 26. The controller then notifies the merchant's point-of-sale (POS) system 27 of the purchase amount of the gift card and the customer identification.

In one embodiment, the gift card programmer 23 programs the gift card with both the amount of the gift card and the customer identification. In an alternative embodiment, the gift card programmer programs the gift card with the customer identification only. The amount of the gift card is sent electronically from the controller 11 to the merchant's POS system 27.

Figure 2:
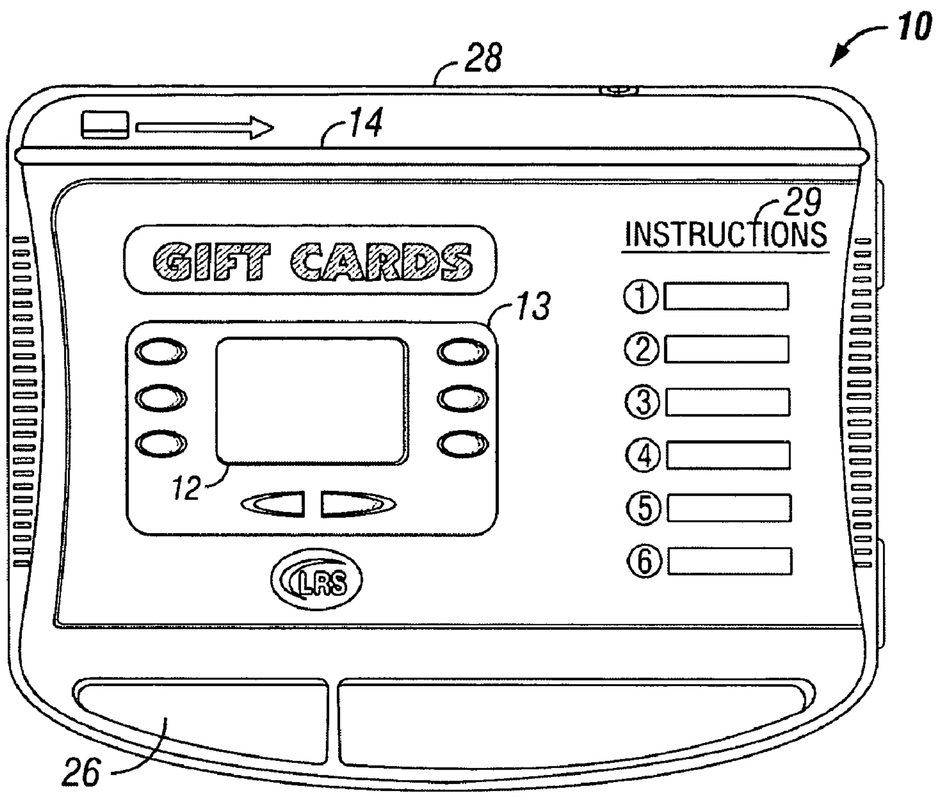
FIG. 2 is an illustrative drawing of a front panel of an exemplary embodiment of the gift card dispenser of the present invention.

FIG. 2 is an illustrative drawing of a front panel 28 of an exemplary embodiment of the gift card dispenser 10 of the present invention. The panel includes the display 12, the customer input pad 13, the credit card reader 14, the good card dispenser 26, and optionally a list of printed instructions 29.

Figure 3:
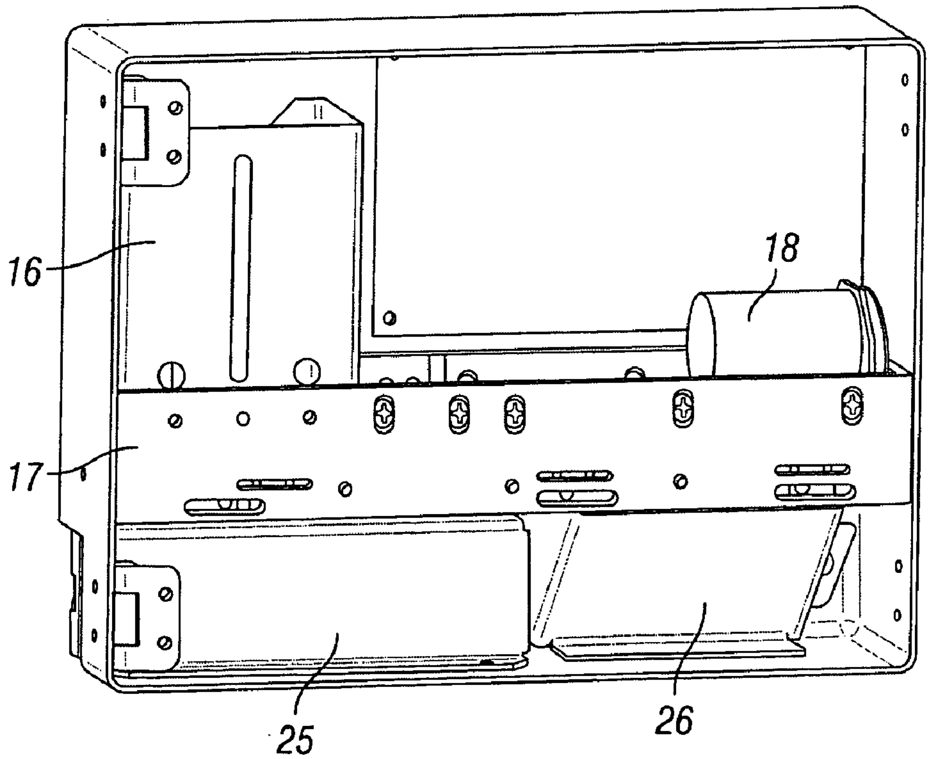
FIG. 3 is a rear-side perspective view of the gift card dispenser of the present invention, with a rear panel removed to show selected internal components.

FIG. 3 is a rear-side perspective view of the gift card dispenser 10 of the present invention, with a rear panel removed to show selected internal components. The components illustrated include the card stock hopper 16, the card transporter 17, the transporter motor 18, the bad card bin 25, and the good card dispenser 26. It should be noted that the gift card dispense may be implemented with multiple card stock hoppers. When mounted adjacent to each other, the dispenser first empties the card stock hopper closest to the dispenser 26, and then pulls cards from the next hopper. When the card slide 21 moves under the closest card stock hopper and there are no cards present, the slide moves under the next hopper, where the slide engages a card and pulls it from the hopper.

Figure 4:
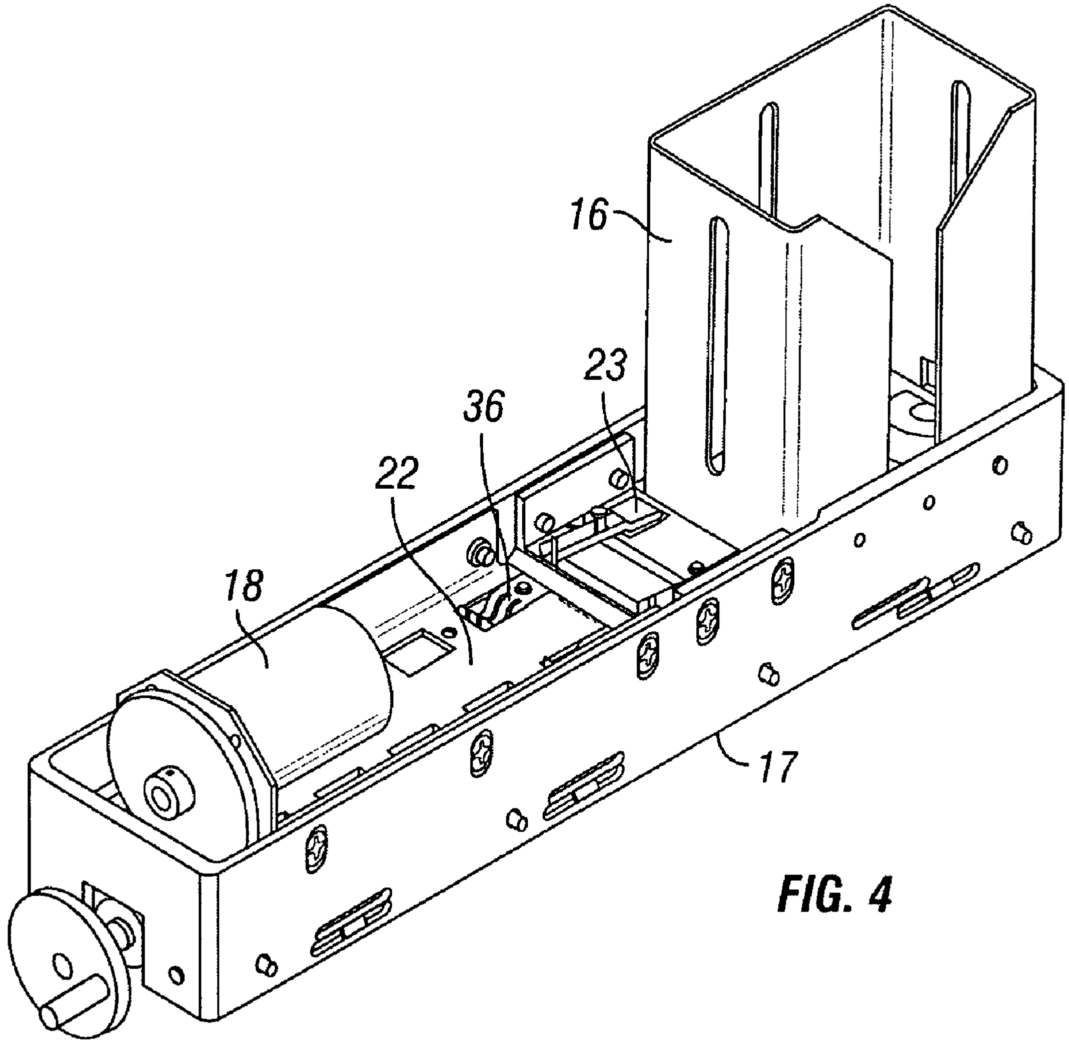
FIG. 4 is a front-side perspective view of a gift card transporter in an exemplary embodiment of the gift card dispenser of the present invention.
Figure 5:
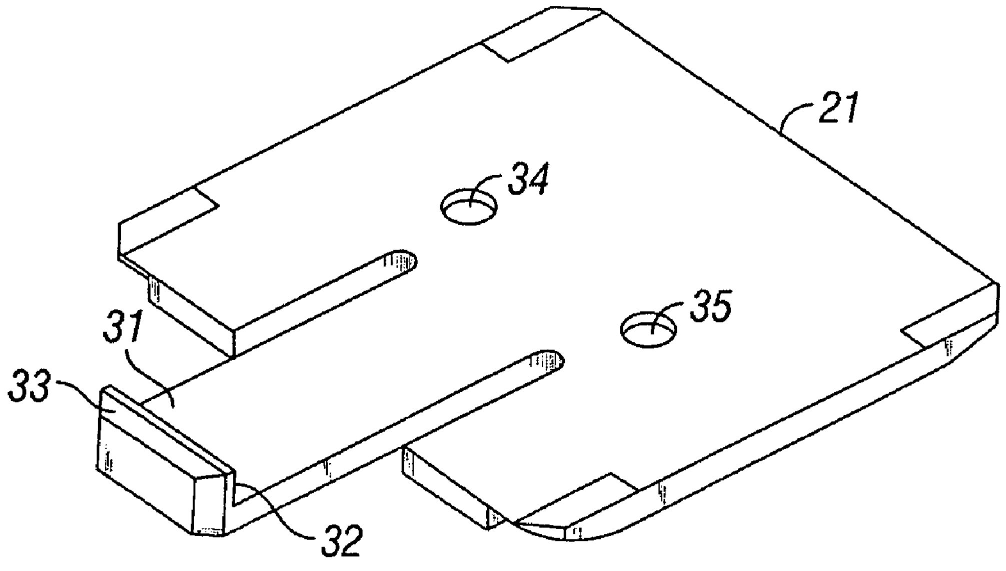
FIG. 5 is a perspective view of a card slide in an exemplary embodiment of the gift card dispenser of the present invention.

FIG. 4 is a front-side perspective view of the gift card transporter 17 in an exemplary embodiment of the gift card dispenser 10 of the present invention. In operation, the transporter removes a gift card from the card stock hopper 16 using the card slide 21, as shown in FIG. 5. Referring briefly to FIG. 5, the card slide includes a flexible extension 31 with a lip 32. The lip has a height sufficient to engage a single gift card when the slide is moved under the card stock hopper. A rear side of the lip is beveled, so that when the slide is moved under the hopper, the bevel causes the flexible extension 31 to flex slightly, allowing the slide to move under the bottommost card in the hopper. In addition, the entire stack of cards in the hopper is jostled upward slightly, which reduces the tendency of cards to stick together. When the card slide is moved completely under the hopper, the flexible extension returns to its unflexed position, and the lip 32 engages the bottommost card. Two holes 34, 35 in the card slide are used to mount the card slide to a threaded slider 41, which moves longitudinally along the bottom of the track 22 when the transporter motor 18 rotates the threaded shaft 19.

Referring again to FIG. 4, a number of springs 36 are mounted along the length of the track, and press the gift card onto the card slide as the slide moves along the track. A series of small detents in the track prevent the card from moving in reverse (i.e., the card cannot move back toward the hopper). This novel design enables the dispenser to use a simple "fish trap" design to reject bad cards. If the gift card inspector 24 determines that a card should be rejected because it was not properly programmed, or it cannot be properly read, the card slide 21 stops directly above the bad card bin 25. The transporter motor 18 then reverses direction, causing the card slide to reverse direction and move back toward the hopper. The bad card is prevented from moving with the card slide, and when the slide has moved out from under the card, the card falls into the bad card bin.

Figure 6:
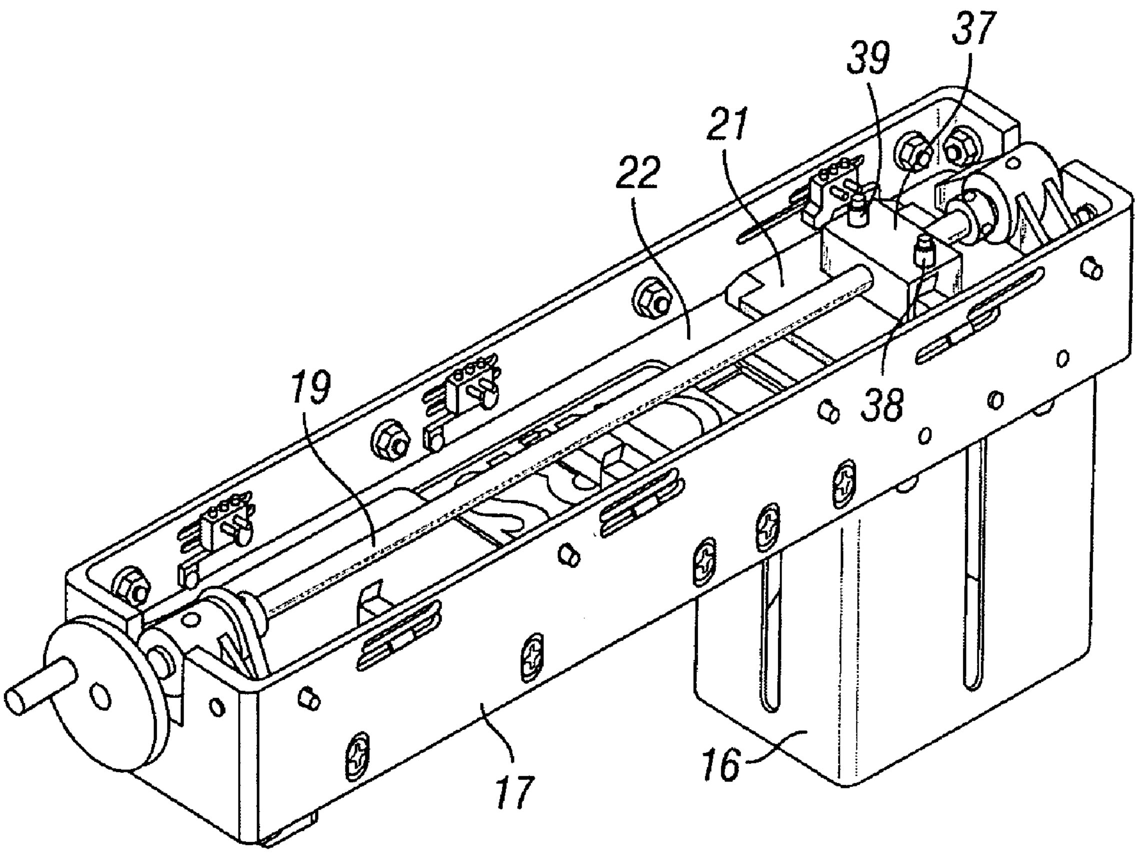
FIG. 6 is a bottom perspective view of the gift card transporter of FIG. 4.

FIG. 6 is a bottom perspective view of the gift card transporter 17 of FIG. 4. This view shows more detail of the mounting of the card slide 21 to the threaded slider 37, which moves longitudinally along the bottom of the track 22 when the transporter motor 18 rotates the threaded shaft 19. Two pins 38, 39 fit into the holes 34, 35 in the card slide, and secure it to the slider 37. By rotating the shaft in opposite directions, the card slide 21 moves longitudinally along the track in both a downstream direction (away from the hopper) and an upstream direction (toward the hopper). If a card becomes jammed in the track in a position between the card slide and the hopper, the transporter motor reverses directions, causing the card slide to move toward the hopper. The bevel 33 on the extension 31 enables the card slide to bypass the jammed card. The transporter motor then reverses again, causing the lip 32 of the card slide to catch the jammed card and clear it from the track.

Figure 7:
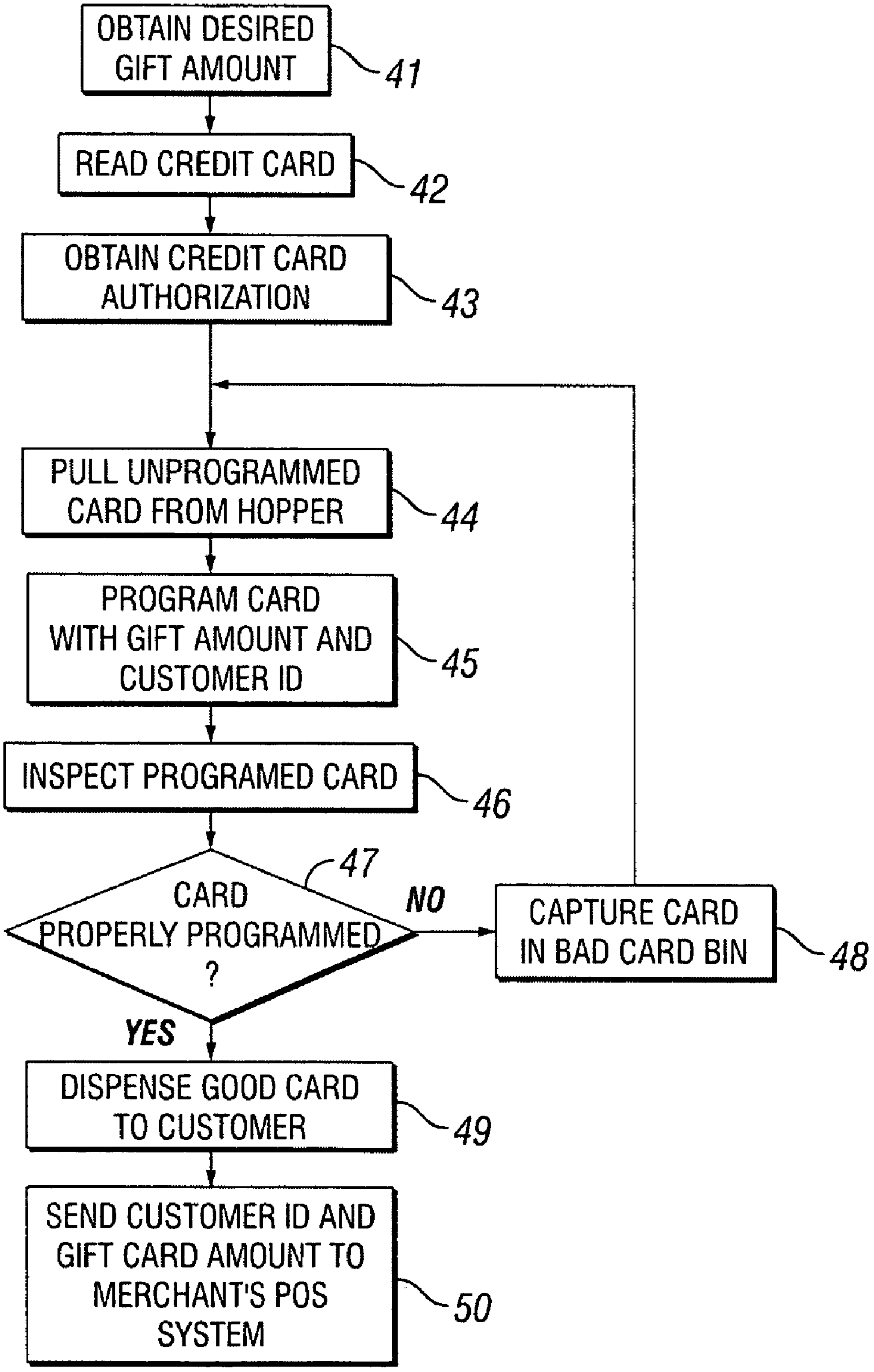
FIG. 7 is a flow chart illustrating the steps of a first exemplary embodiment of the method of the present invention.

FIG. 7 is a flow chart illustrating the steps of a first exemplary embodiment of the method of the present invention. At step 41, the gift card dispenser obtains the desired gift card amount through the customer input pad 13. At step 42, the credit card reader 14 reads the customer's credit card. At step 43, the controller 11 obtains authorization from the remote credit card authorization service 15. This may be done through a phone line or Internet connection. Alternatively, the merchant may already subscribe to an authorization service. In this case, the controller may send an authorization request to the merchant's POS system 27, which obtains approval from the authorization service and informs the controller. At step 44, an unprogrammed card is pulled from the card stock hopper 16. At step 45, the gift card programmer 23 programs the gift card with the gift amount and a customer identification. At step 46, the gift card inspector 24 inspects the programmed gift card, and at step 47, the inspector determines whether the gift card has been properly programmed. If not, the method moves to step 48 where the bad card is captured in the bad card bin 25. However, if the card was properly programmed, the method moves to step 49 where the card is dispensed to the customer through the good card dispenser 26. At step 50, the controller then sends the customer identification and the gift card amount to the merchant's POS system where the information is registered.

Figure 8:
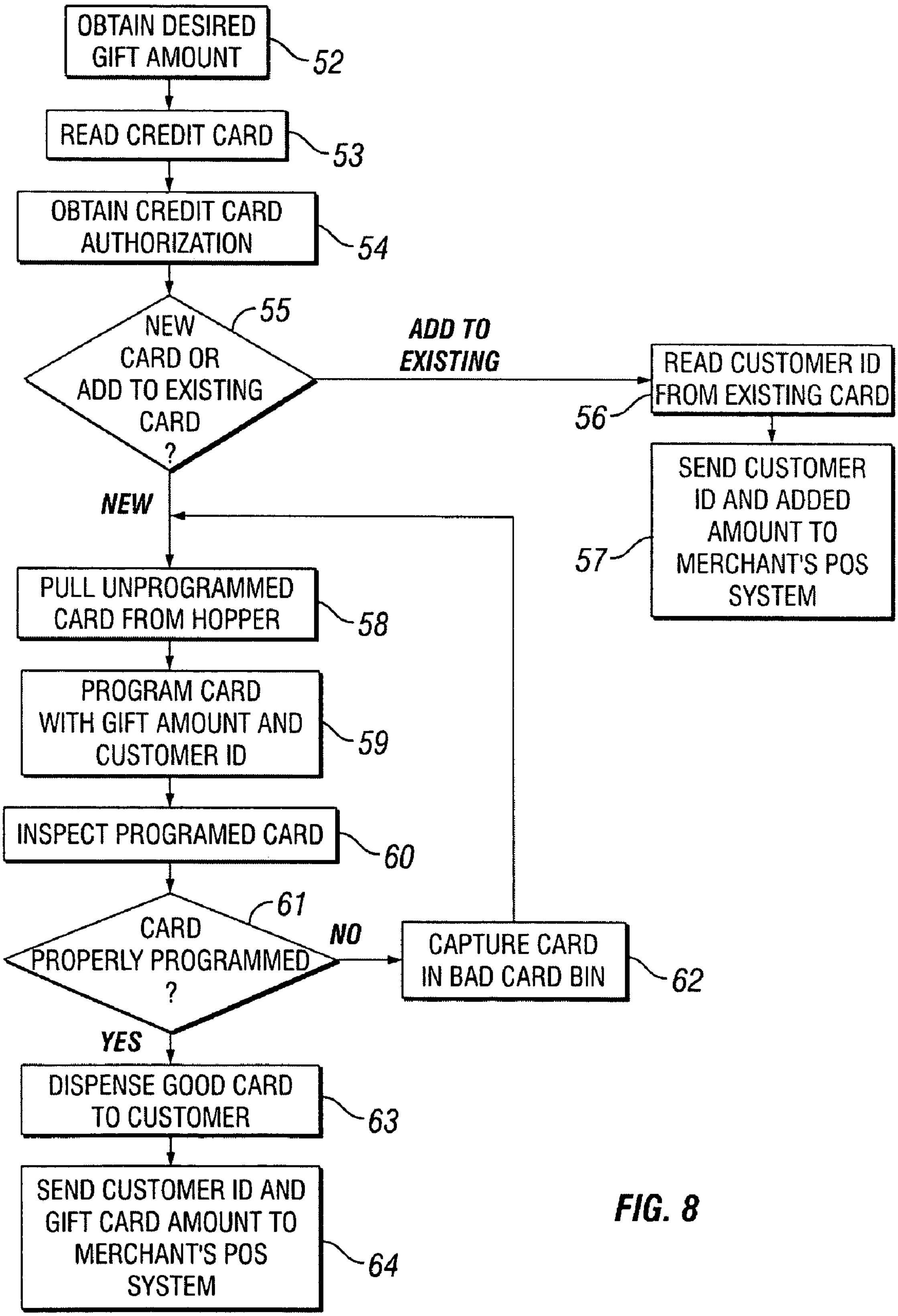
FIG. 8 is a flow chart illustrating the steps of a second exemplary embodiment of the method of the present invention.

FIG. 8 is a flow chart illustrating the steps of a second exemplary embodiment of the method of the present invention. This embodiment provides the customer with the ability to add more money to an existing gift card or purchase a new gift card. At step 52, the gift card dispenser obtains the desired gift card amount through the customer input pad 13. At step 53, the credit card reader 14 reads the customer's credit card. At step 54, the controller 11 obtains authorization from the remote credit card authorization service 15. At step 55, it is determined from the customer, whether the customer desires to purchase a new gift card or add money to an existing gift card. If the customer indicates that she wishes to add to an existing gift card, the method moves to step 56 where the customer identification is read from the existing card or the customer enters her identification through the customer input pad. At step 57, the customer identification and the added amount of the gift card are sent to the merchant's POS system 15 where the information is registered.

However, if the customer indicates at step 55 that she wishes to purchase a new gift card, the method moves to step 58 where an unprogrammed card is pulled from the card stock hopper 16. At step 59, the gift card programmer 23 programs the gift card with the gift amount and a customer identification. At step 60, the gift card inspector 24 inspects the programmed gift card, and at step 61, the inspector determines whether the gift card has been properly programmed. If not, the method moves to step 62 where the bad card is captured in the bad card bin 25. However, if the card was properly programmed, the method moves to step 63 where the card is dispensed to the customer through the good card dispenser 26. At step 64, the controller then sends the customer identification and the gift card amount to the merchant's POS system where the information is registered.

Figure 9:
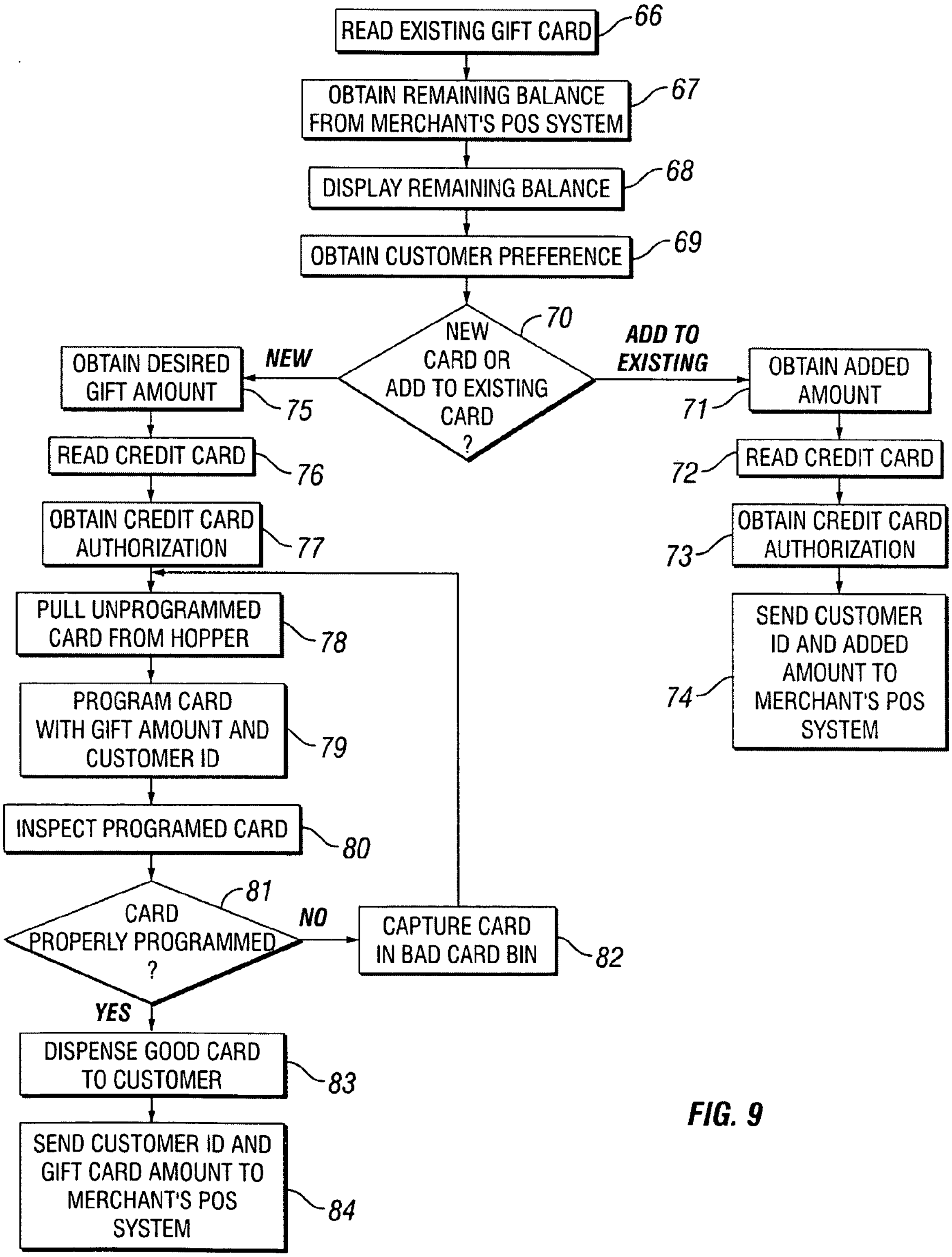
FIG. 9 is a flow chart illustrating the steps of a third exemplary embodiment of the method of the present invention.

FIG. 9 is a flow chart illustrating the steps of a third exemplary embodiment of the method of the present invention. This embodiment provides the customer with the ability to check the remaining balance on an existing gift card prior to deciding whether to add more money to an existing gift card or purchase a new gift card. At step 66, the gift card dispenser reads the existing gift card. At step 67, if the gift card does not have the remaining balance programmed on the card, the dispenser uses the customer identification from the card to obtain the remaining balance from the merchant's POS system 15. At step 68, the dispenser then displays the remaining balance to the customer on the display 12. At step 69, the dispenser obtains the customer's preference through the customer input pad 13. At step 70, it is determined whether the customer desires to purchase a new gift card or add money to an existing gift card. If the customer has indicated that she wishes to add to an existing gift card, the method moves to step 71 where the added amount is obtained through the customer input pad. At step 72, the credit card reader 14 reads the customer's credit card. At step 73, the controller 11 obtains authorization from the remote credit card authorization service 15. At step 74, the customer identification and the added amount of the gift card are sent to the merchant's POS system 15 where the information is registered.

However, if it is determined at step 70 that the customer desires to purchase a new gift card, the method moves to step 75 where the gift card dispenser obtains the desired gift card amount through the customer input pad 13. At step 76, the credit card reader 14 reads the customer's credit card. At step 77, the controller 11 obtains authorization from the remote credit card authorization service 15. At step 78, an unprogrammed card is pulled from the card stock hopper 16. At step 79, the gift card programmer 23 programs the gift card with the gift amount and a customer identification. At step 80, the gift card inspector 24 inspects the programmed gift card, and at step 81, the inspector determines whether the gift card has been properly programmed. If not, the method moves to step 82 where the bad card is captured in the bad card bin 25. However, if the card was properly programmed, the method moves to step 83 where the card is dispensed to the customer through the good card dispenser 26. At step 84, the controller then sends the customer identification and the gift card amount to the merchant's POS system where the information is registered.

Figure 10:
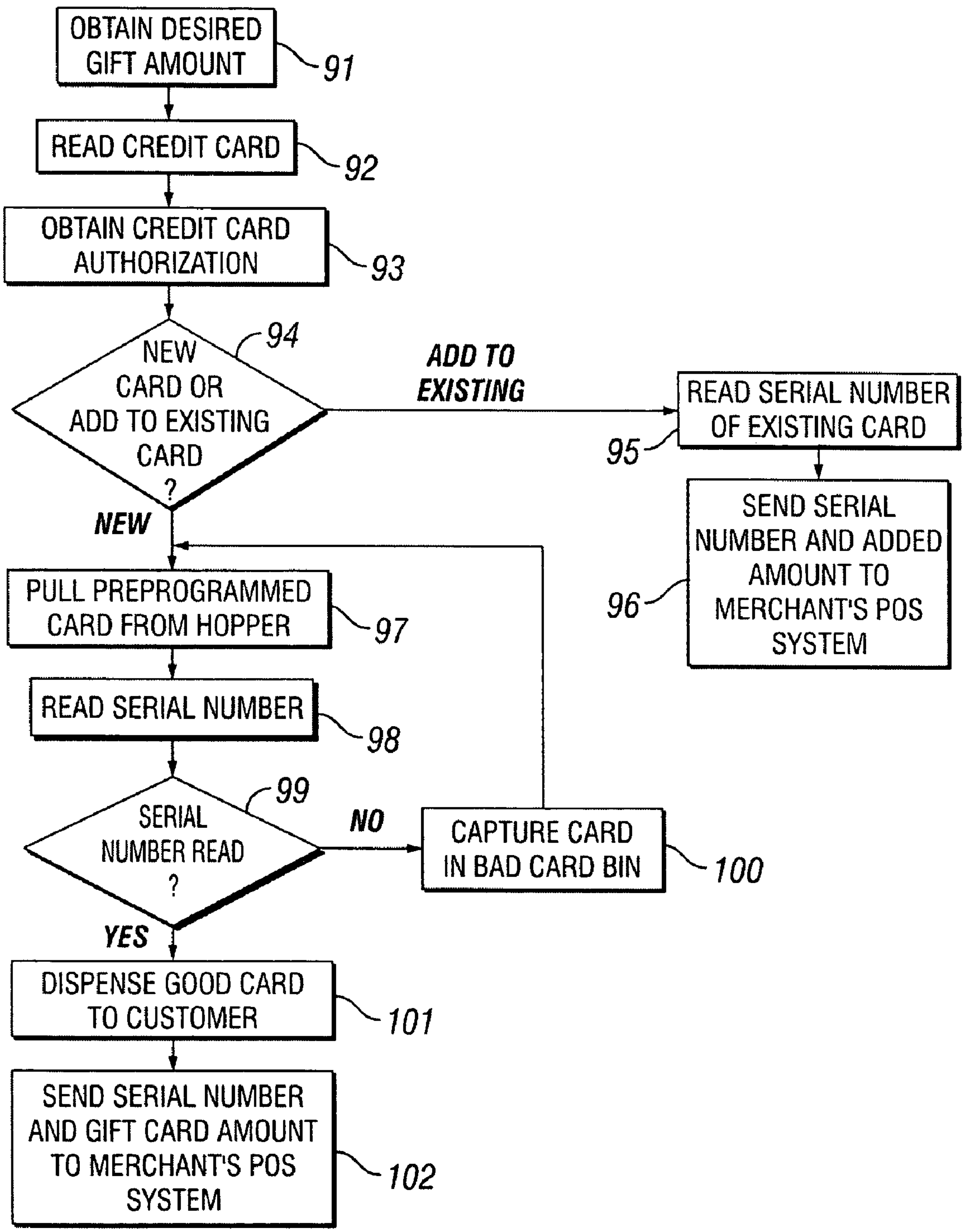
FIG. 10 is a flow chart illustrating the steps of a fourth exemplary embodiment of the method of the present invention.

FIG. 10 is a flow chart illustrating the steps of a fourth exemplary embodiment of the method of the present invention. In this embodiment, the dispenser 10 does not program the gift card at all. Instead, the cards are preprogrammed with a serial number. The gift card inspector 24 reads the preprogrammed serial number, and the controller 11 passes the serial number to the merchant's POS system 27 where the number is registered as having the value purchased by the customer. If the gift card inspector cannot read the preprogrammed serial number, the card is discarded in the bad card bin 25.

Thus, at step 91, the gift card dispenser obtains the desired gift card amount through the customer input pad 13. At step 92, the credit card reader 14 reads the customer's credit card. At step 93, the controller 11 obtains authorization from the remote credit card authorization service 15. At step 94, it is determined from the customer, whether the customer desires to purchase a new gift card or add money to an existing gift card. If the customer indicates that she wishes to add to an existing gift card, the method moves to step 95 where the serial number of the customer's existing gift card is read from the existing card. At step 96, the serial number and the added amount of the gift card are sent to the merchant's POS system 15 where the information is registered.

However, if the customer indicates at step 94 that she wishes to purchase a new gift card, the method moves to step 97 where a preprogrammed card is pulled from the card stock hopper 16. At step 98, the gift card inspector 24 reads the serial number from the gift card, and at step 99, determines whether the serial number could be properly read. If not, the method moves to step 100 where the bad card is captured in the bad card bin 25. However, if the serial number was properly read, the method moves to step 101 where the card is dispensed to the customer through the good card dispenser 26. At step 102, the controller then sends the serial number and the gift card amount to the merchant's POS system where the information is registered.

It is thus believed that the operation and construction of the present invention will be apparent from the foregoing description. While the system and method shown and described has been characterized as being preferred, it will be readily apparent that various changes and modifications could be made therein without departing from the scope of the invention as defined in the following claims.

What is claimed is:

1. An apparatus for generating and dispensing at least one gift card having a financial value for purchasing goods and/or services from an associated merchant, said apparatus comprising:

a customer input pad that receives from a customer, a value for the gift card;

a credit card reader that reads a customer's credit card and obtains authorization for the gift card purchase from an external credit card authorization service;

a first card stock hopper that stores a plurality of gift cards, each of said gift cards being preprogrammed with a unique identifier;

a gift card inspector that determines whether the identifier of a gift card pulled from the card stock hopper can be properly read;

a bad card bin that receives and holds the inspected gift card, if the gift card inspector determines that the identifier of the gift card could not be properly read;

a good card dispenser that dispenses the gift card to the customer, if the card inspector determines that the identifier of the gift card could be properly read; and a card transporter that removes a single card from the card stock hopper, moves the card on a track to the gift card inspector, places the card in the bad card bin if the card inspector determines that the identifier of the gift card could not be properly read, and moves the card on the track to the good card dispenser if the card inspector determines that the identifier of the gift card could be properly read, wherein the card transporter includes:

a transporter motor;

a card slide having a flexible lip that engages a single card when the card slide is moved under a stack of cards in the first card stock hopper, said card slide supporting the gift card against a bottom side of the track; and a threaded shaft connected to the motor and to the card slide, wherein the card slide moves the gift card along the track when the transporter motor rotates the threaded shaft;

wherein the track includes at least one detent that prevents the gift card from moving in reverse toward the card stock hopper, said detent being positioned above the bad card bin, wherein, when the gift card inspector determines that the identifier of a gift card cannot be properly read, the transporter motor reverses the direction of the card slide, thereby causing the detent to hold the sift card in place until the card slide no longer supports the gift card, and the gift card falls into the bad card bin.

2. The apparatus of claim 1, wherein the gift card includes a magnetic strip, and the gift card inspector is a magnetic strip reader.

3. The apparatus of claim 1, further comprising a second card stock hopper mounted adjacent to the first card stock hopper, wherein the card transporter is adapted to sense when there are no cards remaining in the first card stock hopper and to move the card slide under the second card stock hopper in response to sensing that there are no cards remaining in the first card stock hopper.

4. The apparatus of claim 1, wherein the flexible lip of the card slide includes:

a beveled edge on one side that enables the card slide to move under a card when the card slide is moving in a reverse direction toward the first card stock hopper; and a lip on an opposite side that engages the card and moves the card along the track when the card slides moves in a forward direction away from the first card stock hopper.

5. The apparatus of claim 1, wherein the card transporter also includes means for clearing a jammed card from the track.

6. The apparatus of claim 1, further comprising:

a controller; and an interface to the associated merchant's point-of-sale (POS) system, wherein the controller reports the identifier and the value of the gift card to the merchant's POS system.

7. An apparatus for generating and dispensing at least one gift card having a financial value for purchasing goods and/or services from an associated merchant, said apparatus comprising:

a card stock hopper that stores a plurality of gift cards, each of said gift cards being preprogrammed with a unique identifier;

a gift card inspector that determines whether the identifier of a gift card pulled from the card stock hopper can be properly read;

a bad card bin that receives and holds the inspected gift card if the gift card inspector determines that the identifier of the gift card could not be properly read;

a good card dispenser that dispenses the gift card to a customer if the card inspector determines that the identifier of the gift card could be properly read; and a card transporter comprising:

means for removing a single gift card from the card stock hopper;

means for moving the gift card on a track to the gift card inspector;

means for placing the card in the good card dispenser if the card inspector determines that the identifier of the gift card could be properly read; and means for placing the card in the bad card bin if the card inspector determines that the identifier of the gift card could not be properly read, said means for placing the card in the bad card bin including at least one detent in the track positioned above the bad card bin, said detent preventing the gift card from moving past the bad card bin when the card inspector determines that the identifier of the gift card could not be properly read, said detent causing the moving means to move from under the gift card, thereby causing the gift card to fall into the bad card bin.

8. The apparatus of claim 7, further comprising:

a customer input pad that receives from the customer, a value for the gift card; and a credit card reader that reads the customer's credit card and obtains authorization for the gift card purchase from an external credit card authorization service.

9. The apparatus of claim 8, further comprising:

a controller; and an interface to the associated merchant's point-of-sale (POS) system, wherein the controller reports the identifier and the value of the gift card to the merchant's POS system.

* * * * *